(12) United States Patent
Tsukada (10) Patent No.: US 6,253,453 B1
(45) Date of Patent: *Jul. 3, 2001

(54) METHODS OF MANUFACTURING A LINEAR GUIDE DEVICE AND A BALL SCREW DEVICE

(75) Inventor: Toru Tsukada, Gunma (JP)

(73) Assignee: NSK LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/599,105

(22) Filed: Feb. 9, 1996

Related U.S. Application Data (63) Continuation of application No. 08/267,239, filed on Jun. 29, 1994, now abandoned.

(30) Foreign Application Priority Data

| Jun. 30, 1993 | (JP) | ................................................... 5-163017 |
| Apr. 6, 1994 | (JP) | ................................................... 6-068418 |

(51) Int. Cl.[7] ................................................. B23P 13/00
(52) U.S. Cl. ........................ 29/898.03; 29/460; 29/527.4; 427/300
(58) Field of Search ........................... 427/300; 29/527.4, 29/898.03, 424, 460

(56) References Cited

U.S. PATENT DOCUMENTS

| 4,432,122 | * | 2/1984 | Iijima ............................. 29/527.4 X |
| 4,726,432 | * | 2/1988 | Scott et al. ..................... 29/527.4 X |
| 5,356,255 | * | 10/1994 | Takahashi et al. ............... 427/300 X |

FOREIGN PATENT DOCUMENTS 2-55515   11/1990   (JP) .

* cited by examiner

*Primary Examiner*—Tom Hughes
(74) *Attorney, Agent, or Firm*—Sughrue, Mion, Zinn, Macpeak & Seas, PLLC (57) ABSTRACT

In a guide rail or slider body manufacturing method for a linear guide device providing a guide rail and a slider mounted on the guide rail, mounting reference surfaces formed on the guide rail or slider body and/or the surfaces of ball rolling grooves formed therein are finished by grinding, and are subjected to rust-proofing surface treatment with protecting members fitted to the surfaces thus finished. Similarly in a method of manufacturing a ball screw device providing a screw shaft and a ball screw nut engaged with the screw shaft, the surfaces of ball rolling grooves formed in the screw shaft and the ball screw nut are finished by grinding, and are subjected to rust-proofing surface treatment with protecting members fitted to the surfaces thus finished. In the methods, the rust-proofing surface treatment is carried out for the surfaces except those which should not be covered with such a rust-proofing film layer for their precision.

4 Claims, 4 Drawing Sheets

METHODS OF MANUFACTURING A LINEAR GUIDE DEVICE AND A BALL SCREW DEVICE

This is a Continuation of application Ser. No. 08/267,239 filed Jun. 29, 1994, now abandoned.

BACKGROUND OF THE INVENTION

The present invention relates to a method of manufacturing a linear guide device operating as linear guide bearing means and a method of manufacturing a ball screw device, and more particularly to methods of manufacturing a guide rail or a slider body for a linear guide device and to a method of manufacturing a screw shaft and a ball screw nut for a ball screw device, in which their surfaces except the surfaces of parts such as rolling-element rolling grooves and mounting reference surfaces which must be finished with high accuracy, are subjected to rust proofing surface treatment so that the resultant surfaces are completely free from surface damage.

Figure 8:
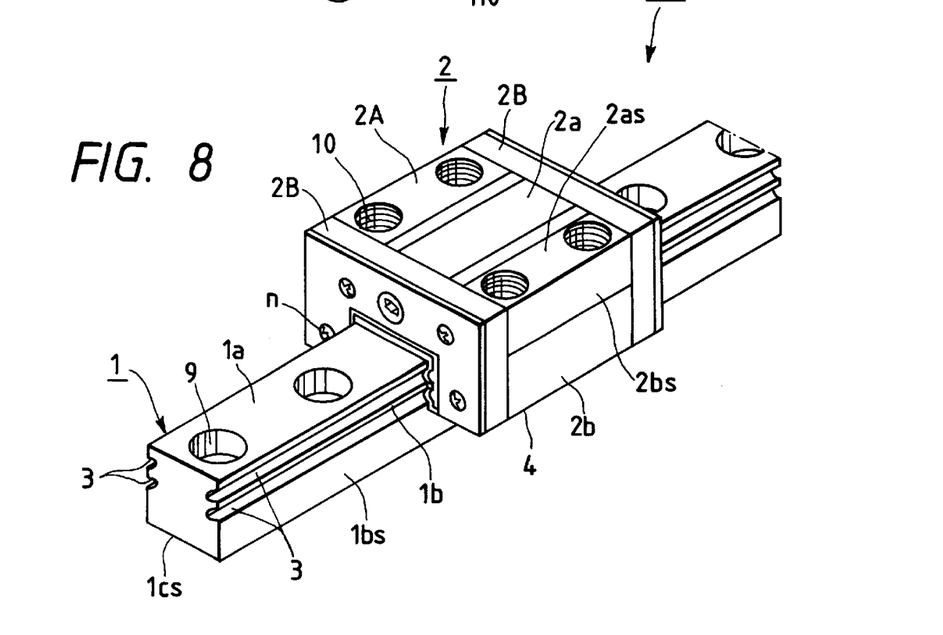
FIG. 8 is a perspective view showing the whole arrangement of the linear guide device.
Figure 9:
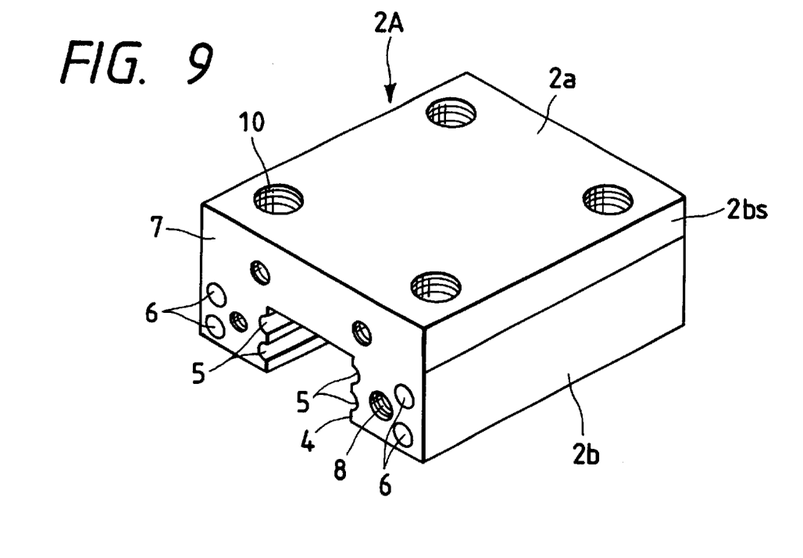
FIG. 9 is a perspective view of the slider body of the linear guide device.
Figure 10:
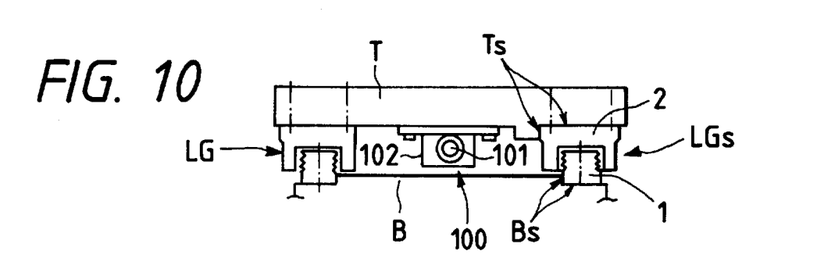
FIG. 10 is an explanatory diagram showing the ball screw device coupled to the linear guide device.

An example of a linear guide device is as shown in FIGS. 8 through 10.

The linear guide device LG provides: a guide rail 1 which is axially elongated; and a slider 2 substantially U-shaped in section which is slidably mounted on the guide rail 1. The guide rail 1 has load ball rolling grooves 3 in its both side surfaces. The surfaces of the load ball rolling grooves 3 are finished by grinding. The slider 2 includes a slider body 2A having a pair of right and left wings 4 and 4. Another load ball rolling grooves 5 are formed in the inner surfaces of the right and left wings 4 and 4 so that they are confronted with the above-described load ball rolling grooves 3. The surfaces of the load ball rolling grooves 5 are also finished by grinding. A number of load balls (not shown) are rollingly fitted in the spaces defined by the opposing load ball rolling grooves 3 and 5. That is, the slider 2 is allowed to slide along the guide rail through the infinite circulation of those load balls.

For the infinite circulation of the load balls, the slider 2 is designed as follows: Through-holes 6 are formed, as ball returning paths, in the right and left wings of the slider body 2A so that they are in parallel with the load ball rolling grooves 5. In addition, U-shaped curved paths (not shown) are form in end caps 2B substantially U-shaped in section which are secured to the front and rear end faces 7 of the slider body 2A, so that the ball rolling grooves 5 are communicated with the ball returning paths 6 through the curved paths thus formed; that is, infinite circulating paths are formed for the load balls. In order to secure the end caps 2B to the front and rear end faces 7 of the slider body 2A with bolts, threaded holes 8 are formed in the front and rear end faces 7 of the slider body 2A.

The linear guide device LG is installed for instance as shown in FIG. 10. The guide rail 1 is fixedly mounted on the machine bed B with bolts, while the slider 2 is fixedly secured to the machine table T with bolts, so that the machine table T is linearly guided. For this installation, mounting bolt holes 9 are formed in the guide rail 1 at intervals which are through-holes extended from the upper surface 1a to the lower surface 1cs; and threaded holes 10 are formed in the four corners of the upper surface of the slider body 2A which are engaged with the mounting bolts.

In setting the linear guide device LG, first the guide rail 1 and the slider 2 of a linear guide device LGs on the reference side are fixed, and adjustment is made with the linear guide device LG on the adjustment side to obtain the necessary mounting accuracy. For this purpose, a mounting reference surface 1cs is formed in the lower surface of the guide rail 1 by grinding which is brought into contact with the mounting reference surface Bs of the machine bed B, and similarly a mounting reference surface 1bs is formed as a part of the side surface 1b of the guide rail 1 by grinding. In addition, a mounting reference surface 2as is formed in the upper surface 1a of the slider body 2A by grinding which is brought into contact with the mounting reference surface Ts of the machine table T, and similarly a mounting reference surface 2bs is formed as a part of the side surface 2b of the slider body 2A.

The accuracies of finishing of the mounting references surfaces 1cs, 1bs, 2as and 2bs of the guide rail 1 and the slider 2 of the linear guide device LGs on the reference side, greatly affect the linear guiding accuracy of the device. Hence, no rust proofing surface treatment is applied to the guide rail 1 and the slider body 2A which are, in general, formed by machining steel, and instead a lubricant containing a rust proofing agent is supplied to the load ball rolling grooves 3 and 5 so that the guide rail and the slider are not only lubricated but also rust-proofed.

Figure 11:
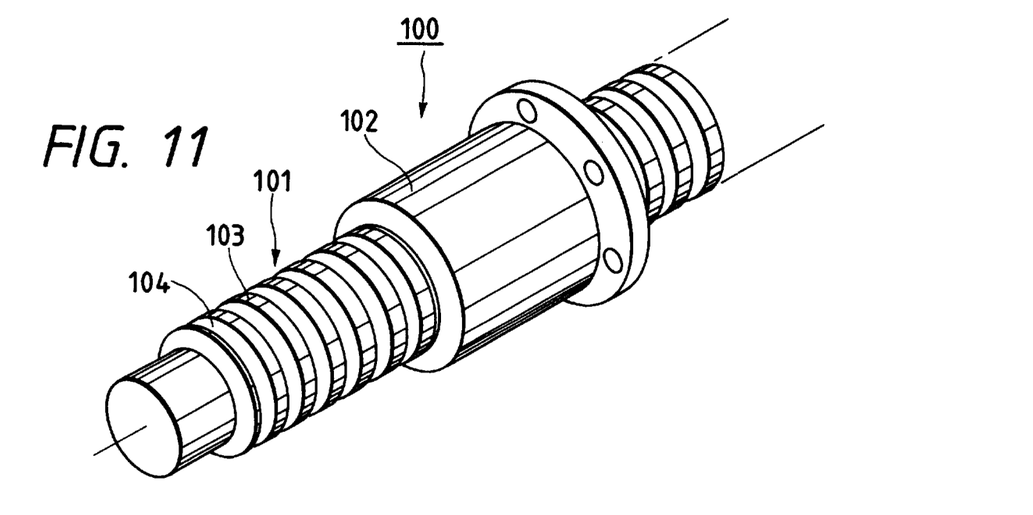
FIG. 11 is a perspective view of the ball screw device.

On the other hand, an example of a, ball screw device is as shown in FIG. 11.

The ball screw device 100 provides a screw shaft 101 and a ball screw nut 102. Ball rolling grooves 104 are spirally formed in the surface 103 of the screw shaft 101, while ball rolling grooves are formed in the inner surface (not shown) of the ball screw nut 102 so that they are confronted with the aforementioned ball rolling grooves 104. Those ball rolling grooves are finished by grinding. A number of balls are rollingly fitted in the spaces defined by the ball rolling grooves which are confronted with each other. That is, the ball screw nut 102 is moved relative to the screw shaft 101 through the infinite circulation of those balls.

The ball screw device 100 is rotatably mounted on the machine bed B as shown in FIG. 10 with both end portions of the screw shaft 101 supported through bearings. The ball screw nut 102 engaged with the screw shaft 101 is fixedly secured to the lower surface of the machine table T with bolts. Under this condition, the screw shaft 101 is rotated by a driving motor (not shown) so that the machine table T is moved along the linear guide device LG. In the case of the ball screw device 100 too, a lubricant containing a rust proof agent is applied to the ball rolling grooves of the screw shaft 101 and the ball rolling grooves and the ball circulating paths in the ball screw nut 102, so that they are not only lubricated but also rust-proofed.

In the linear guide device LG, the load ball rolling grooves 3 and 5, and the ball returning paths 6 scarcely rust because of being lubricated at all times. Similarly, in the ball screw device 100, the ball rolling grooves 104 of the screw shaft 101, and the ball rolling grooves and the circulating paths of the ball screw nut scarcely rust because of being lubricated at all times. However, the outer surfaces of the guide rail 1 and the slider body 2A, and the outer surface of the ball screw nut 102 are liable to rust due to being not lubricated.

On the other hand, Examined Japanese Patent Publication No. 55515/1990 has disclosed a bearing slider manufacturing method in which a bearing block (corresponding to a slider body) having load ball rolling grooves, ball returning paths and mounting reference surfaces is formed by machining a hardenable steel, and the bearing block thus formed is hardened, and then subjected to black chrome plating to form a protective layer on it, and thereafter mounting reference surfaces and load ball rolling grooves are formed in the bearing block by grinding.

More specifically, in the method of manufacturing the slider of the linear guide device disclosed by the Examined Japanese Patent Publication No. 55515/1990, the slider body in which the load ball rolling grooves, the ball returning paths, the mounting reference surfaces, and the threaded holes have been formed by machining, is subjected to black chrome plating so as to form a rust-proofing layer over all the surfaces of the slider body including the load ball rolling grooves, the ball returning paths, and so forth. Thereafter, the mounting reference surfaces and the load ball rolling grooves which should not be plated from the point of view of operating accuracy, are ground on the grinder. Hence, the method suffers from the following difficulties:

When the slider body is mounted on the grinder, its surfaces other than the mounting reference surfaces and the load ball rolling grooves; that is, the surfaces which should be held covered with the rust-proofing layer may be damaged, or the rust-proofing layers may be peeled off those surfaces, resulting in that the slider body is insufficient in rust prevention.

The surface treatment of the ball screw device 100 is similar to that of the slider body described above. That is, after the ball rolling grooves and the ball circulating paths are formed in the screw shaft and the ball screw nut by machining, a rust-proofing layer is formed over all the surfaces of the screw shaft and the ball screw nut including the ball rolling grooves and the ball circulating paths by plating. Thereafter, the ball rolling grooves which should not be covered with the rust-proofing layer are ground to remove the layer. In this case, similarly as in the above-described linear guide device LG, the surfaces other than the surfaces of the ball rolling grooves may be damaged, or the rust-proofing layers may be peeled off those surfaces, resulting in that the ball screw device is insufficient in rust prevention.

SUMMARY OF THE INVENTION

Accordingly, an object of the present invention is to eliminate the above-described difficulties accompanying conventional methods of manufacturing a linear guide device and a ball screw device.

More specifically, a first object of the present invention is to provide a method of manufacturing a linear guide device in which, after its components are subjected to surface treatment, it is unnecessary to machine the components.

A second object of the present invention is to provide a method of manufacturing a ball screw device in which, after its components are subjected to surface treatment, it is unnecessary to machine the components.

The foregoing objects and other objects of the present invention have been achieved by the provision of the following methods:

The first aspect is a guide rail manufacturing method for a linear guide device providing: a guide rail including a first load rolling-element rolling groove extended axially in a side surface thereof; and a slider including a second load rolling-element rolling groove so that the second load rolling-element rolling groove is confronted with the first load rolling-element rolling groove of the guide rail, and the slider being moved relative to the guide rail through a plurality of rolling elements which are rolled in a space defined by the first and second load rolling-element rolling grooves, in which, according to the present invention, the method provides the steps of: grinding at least one surface of a reference surface formed in an outer surface of the guide rail for mounting the slider and a groove surface of the first load rolling-element rolling groove; preparing a protecting member and fitting the protecting member to the ground surface; and then subjecting the guide rail to rust-proofing surface treatment.

The second aspect is a slider body manufacturing method for a linear guide device providing: a guide rail including a first load rolling-element rolling groove extended axially in a side surface thereof; and a slider including a slider body and a second load rolling-element rolling groove so that the second load rolling-element rolling groove is confronted with the first load rolling-element rolling groove of the guide rail, and the slider being moved relative to the guide rail through a plurality of rolling elements which are rolled in a space defined by the first and second load rolling-element rolling grooves, in which, according to the present invention, the method provides the steps of: grinding at least one surface of a reference surface formed in an outer surface of the slider body for mounting the slider and a groove surface of the second load rolling-element rolling groove; preparing a protecting member and fitting the protecting member to the ground surface; and then subjecting the slider body to rust-proofing surface treatment.

The third aspect is a method of manufacturing a ball screw device providing: a screw shaft including a first ball rolling groove formed in a spiral shape in an outer cylindrical surface thereof; and a ball screw nut including a second ball rolling groove so that the second ball rolling groove is confronted with the first ball rolling groove of the screw shaft, and the ball screw nut being moved relative to the screw shaft through a plurality of rolling elements which are rolled in a space defined by the first and second ball rolling grooves, in which, according to the present invention, the method provides the steps of: grinding at least one surface of groove surfaces of the first and second ball rolling grooves; preparing a protecting member and fitting the protecting member to the ground surface; and then subjecting the ball screw device to rust-proofing surface treatment.

In the methods according to the present invention, before the rust-proofing surface treatment is carried out, the mounting reference surfaces finished are masked with the protecting members. Therefore, no rust-proofing film layer is formed on the mounting reference surfaces, so that the guide rail, the slider body and the ball screw device are manufactured high in accuracy. Further, since it is unnecessary to machine the components, the rust-proofing film layer thus formed is not damaged and peeled off, thereby sufficiently contributing to the rust-proofing.

DETAILED DESCRIPTION OF THE PREFERRED EMBODIMENTS

Preferred embodiments of the present invention will be described with reference to the accompanying drawings, in which parts corresponding functionally to those which have been described with reference to the above-described conventional linear guide device or ball screw device are therefore designated by the same reference numerals or characters.

Figure 1:
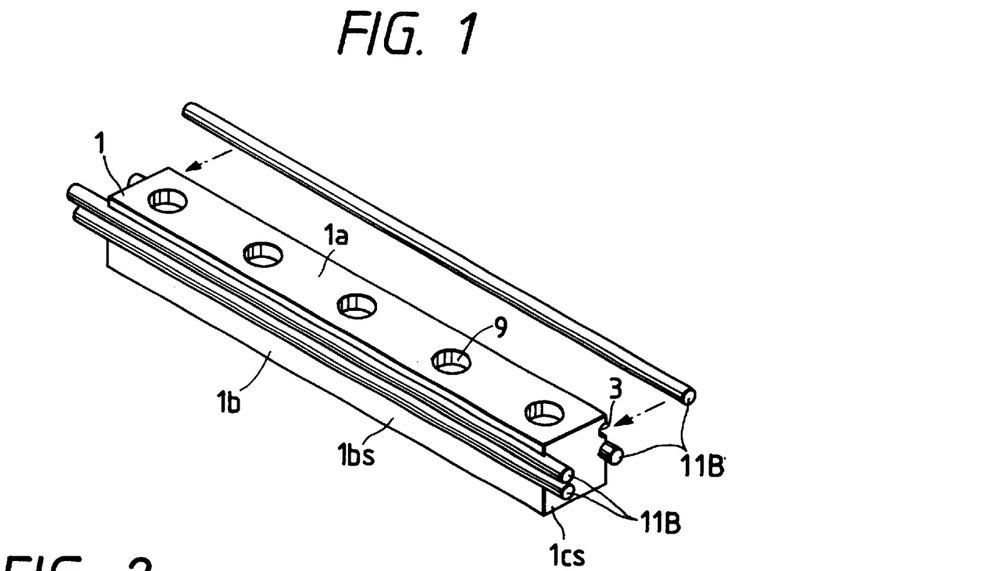
FIG. 1 is a perspective view for a description of the masking of ball rolling grooves formed in the guide rail of a linear guide device which is carried out before a surface treating step in a guide rail manufacturing method according to the present invention.
Figure 2:
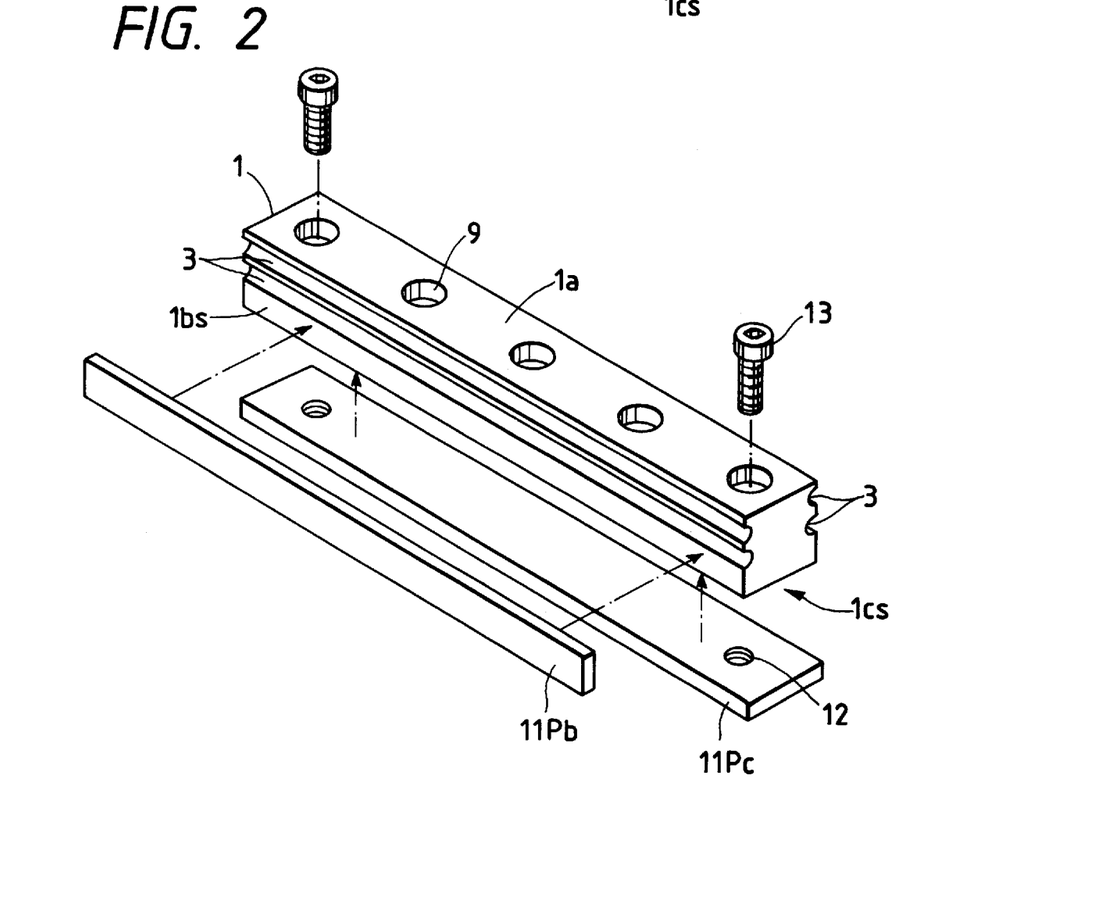
FIG. 2 is a perspective view for a description of the masking of mounting references surfaces of the guide rail in the guide rail manufacturing method.

FIGS. 1 and 2 show intermediate manufacturing steps in the manufacture of a guide rail 1 according to the present invention.

The guide rail 1 is formed as follows: First, by drawing a suitable steel, the guide rail is obtained which is shaped in external configuration as required. Then, wire grooves for insertion of cage wires are cut in the bottoms of the load ball rolling grooves 3. Thereafter, the guide rail 1 thus treated is subjected to heat treatment, and then mounting bolt holes 9 are formed in it.

Next, the upper surface 1a, the side surfaces 1b (including the mounting reference surface 1bs) and the lower surface 1cs are finished by grinding. Under this condition, the load ball rolling grooves 3 are also finished by grinding. More specifically, the load ball rolling grooves 3 in the two side surfaces of the guide rail 1 are finished at the same time.

Under this condition, protecting members (described later in more detail) are fitted in the load ball rolling grooves 3 thus finished, to mask the surfaces of the grooves 3. The guide rail 1 thus treated is subjected to rust-proofing surface treatment such as chrome plating and nickel plating.

The fitting of the protecting members in the load ball rolling grooves 3 which have been finished is carried out as shown in FIG. 1. In this case, the protecting members are protecting rods 11B which correspond in configuration and dimension to the load ball rolling grooves 3. The protecting rods 11B are fixedly fitted in the load ball rolling grooves 3 formed in both side surfaces 1b of the rail guide 1. In order to fixedly hold the protecting rods 11B in the load ball rolling grooves, any means may be adopted which will not mask the surfaces which should be subjected to the rust-proofing surface treatment. In the case of FIG. 1, the protecting rods 11B are fixedly held by clamping them with large clothes pins at both ends of the guide rail 1.

On the other hand, for the mounting reference surfaces 1bs and 1cs which have been finished by grinding, other protecting members (described later) are fixed to the guide rail 1 as shown in FIG. 2. In this case, the protecting members are a protecting plate 11Pb corresponding in size to the mounting reference surface 1bc in the side surface of the guide rail 1, and a protecting plate 11Pc corresponding in size to the mounting reference surface 1cs of the lower surface of the guide rail 1. Those protecting plates 11Pb and 11Pc are fixedly secured to the mounting reference surfaces 1bs and 1bc, respectively, as follows: The protecting plate 11Pb is made of magnetic metal material, and magnetized. Therefore, the protecting plate 11Pb is magnetically stuck on the guide rail 1. On the other hand, the protecting plate 11Pc for masking the mounting reference surface ics of the lower surface of the guide rail 1 has threaded holes 12. Bolts 13 are inserted into the mounting bolt holes 9 in the guide rail 1 and engaged with the threaded holes 12 of the protecting plate 11Pc, so that the plate 11Pc is fixedly secured to the lower surface of the guide rail 1.

In the above-described embodiment, only the protecting plate 11Pb for the mounting reference surface in the side surface of the guide rail 1 is magnetized; however, the present invention is not limited thereto or thereby. That is, the protecting rods 11B for the load ball rolling grooves 3, and the protecting plate 11Pc for the mounting reference surface 1cs of the lower surface of the guide rail 1 may be replaced with ones magnetized. In this case, the use of the clothes pins and the mounting bolts 13 can be eliminated.

Fundamentally, the above-described protecting members may be of either metal or non-metal as far as they are able to mask the predetermined surfaces of the guide rail in the rust proofing surface treatment. However, preferably the protecting member which is to be magnetically stuck on the given surface is made of magnetic metal material such as iron magnet, or rubber or plastics mixed with magnetic metal powder.

As for the protecting member of plastic magnet, a rare-earth plastic magnet "NEODEX-8" (trade name) available in market is suitable. The magnet is formed as follows: A mixture is formed by mixing rare-earth magnetic powder of, for instance, samarium cobalt or neodymium, iron and boron with plastics. The mixture thus formed is used to form bar-shaped magnets or other magnets which are shaped as desired. The magnet is snugly fitted onto the surface which is to be masked. The bar-shaped magnet may be freely deformed; for instance it can be spirally wound.

Instead of the rare-earth magnetic powder, "Alnico" magnetic powder or ferrite magnetic powder may be mixed with plastics to form plastic magnets. However, from the point of view of magnetization, it is preferable to use the rare-earth plastic magnet.

On the other hand, as for the protecting members of rubber magnet, the above-described magnetic powder is mixed with natural rubber or synthetic rubber to form magnets which are bar-shaped or other magnets shaped as desired.

Figure 3:
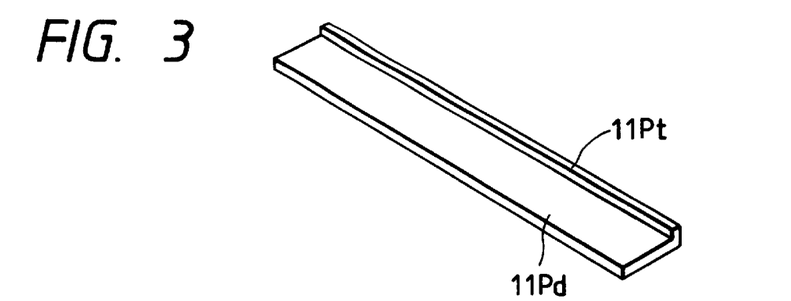
FIGS. 3 and 4 are perspective views showing modifications of a protecting member which is used for masking the mounting reference surface in the guide rail manufacturing method.

In the case where the magnetized protecting plate is used for the mounting reference surface of the lower surface of the guide rail, it is unnecessary to form the threaded holes 12 and to use the bolts 13. However, in this case, it is preferable that, as shown in FIG. 3, a strip-like stopper 11Pt is formed along at least one edge of the protecting plate, so that the protecting plate can be readily positioned in plate. More specifically, the mounting plate can be positioned by setting its stopper 11Pt against the side surface of the guide rail 1.

Figure 4:
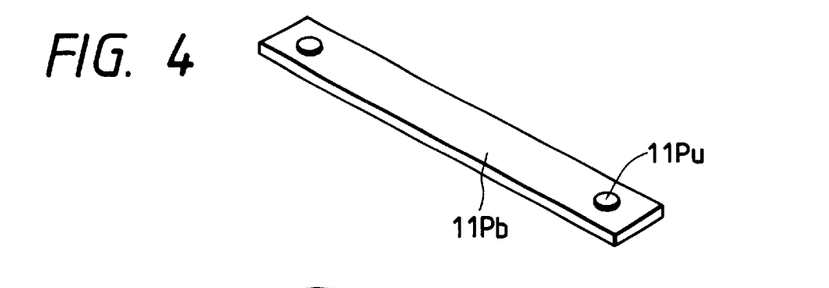

In addition, the magnetized protecting plate may be modified as shown in FIG. 4 in which, instead of the stopper 11Pt, protrusions 11Pu are formed on the protecting plate so that they are engaged with the mounting bolt holes 9 of the guide rail 1.

A method of manufacturing the slider body 2A of the linear guide device is fundamentally equal to the above-described guide rail manufacturing method.

Figure 5:
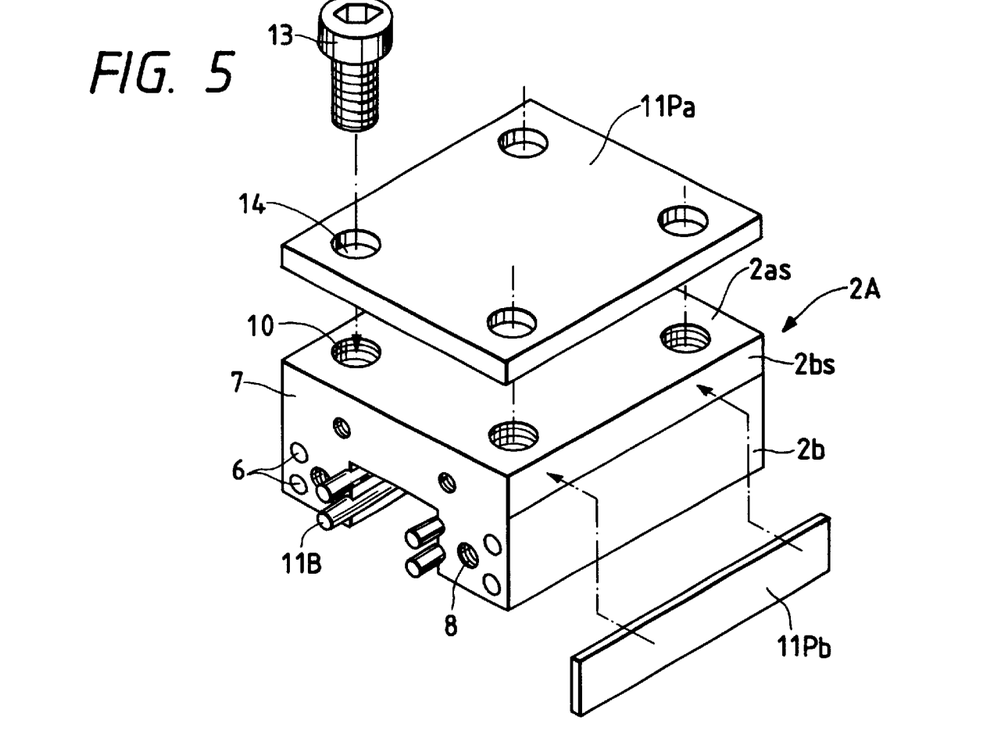
FIG. 5 is a perspective view for a description of the masking of ball rolling grooves and mounting reference surfaces formed on the slide body of the linear guide device which is carried out before a surface treating step in a slide body manufacturing method according to the present invention.

That is, first by drawing a steel, the slider body is formed which is shaped in external configuration as required. Thereafter, the ball returning paths 6 are formed in the slider body 2A thus formed, and the threaded holes 8 are also formed in the two end faces 7 of the slider body 2A, and furthermore the threaded holes 10 are formed in the four corners of the upper surface of the slider body 2A with which the mounting bolts 13 are engaged.

Next, the slider body is subjected to heat treatment, and then three surfaces, namely, the upper surface 2a and the side surfaces 2b (including the mounting reference surface 2bs) are finished by grinding. Thereafter, the load ball rolling grooves 5 are formed by grinding.

Under this condition, the surfaces finished by grinding are masked with protecting members (11B, 11Pa and 11Pb) fitted in the slider body 2A as shown in FIG. 5. Then, the slide body is subjected to rust-proofing surface treatment such as chrome plating and nickel plating.

The masking of the surfaces finished is carried out as follows:

As for the load ball rolling grooves 5, the protecting members provide protecting rods 11B which correspond in configuration and size to the load ball rolling grooves 5 and are magnetized. The protecting rods 11B are magnetically fitted in the load ball rolling grooves 5.

As for the mounting reference surface 2as of the upper surface of the slider body, the protecting member provides a protecting plate 11Pa which corresponds in size to the mounting reference surface 2as and has bolt-inserting holes 14 in correspondence to the threaded holes 10 with which mounting bolts 13 are engaged. The protecting plate 11Pa is fixedly mounted on the slider body 2A with the mounting bolts 13 as shown in FIG. 5.

As for the mounting reference surface 2bs in the side surface of the slider body 2A, the protecting member provides a protecting plate 11Pb which is made of magnetic metal material and is magnetized. The protecting plate 11Pb is magnetically secured to the slider body 2A (of steel) to mask the mounting reference surface 2bs.

The protecting plate 11Pa may be replaced with a protecting plate which is made of magnetic metal material and magnetized. Similarly as in the case of the protecting plate 11Pb, the magnetized protecting plate is magnetically secured to the slider body to mask the mounting reference surface 2as. The employment of the magnetized protecting plate dispenses with the formation of the bolt-inserting hoes 14 and the use of the mounting bolts 13. The magnetized protecting plate may be so modified that it has a strip-like stopper or protrusions as in the case of the protecting plate for the guide rail shown in FIGS. 3 and 4.

Fundamentally, the above-described protecting members may be of either metal or non-metal so far as they are able to mask the predetermined surfaces of the slide body in the rust proofing surface treatment. However, it is preferable that the protecting member which is to be magnetically stuck on the given surface is made of magnetic metal material such as iron magnet, or rubber or plastics mixed with magnetic metal powder.

In the case where the protecting member is of metal, the following difficulty may occur: That is, if the protecting member of metal is somewhat bent or curved, then a gap is formed between the protecting member and the guide rail 1 or the slider body 2A. In this case, the rust-proofing agent or plating solution enters the gap, as a result of which the surfaces which need no rust-proofing surface treatment are subjected to rust-proofing surface treatment. This difficulty is eliminated by the employment of the protecting member which is a plastic magnet or rubber magnet, because it is brought into close contact with the surface which should not be subjected to rust-proofing surface treatment, thus suitably and sufficiently masking it.

Figures 6, 7:
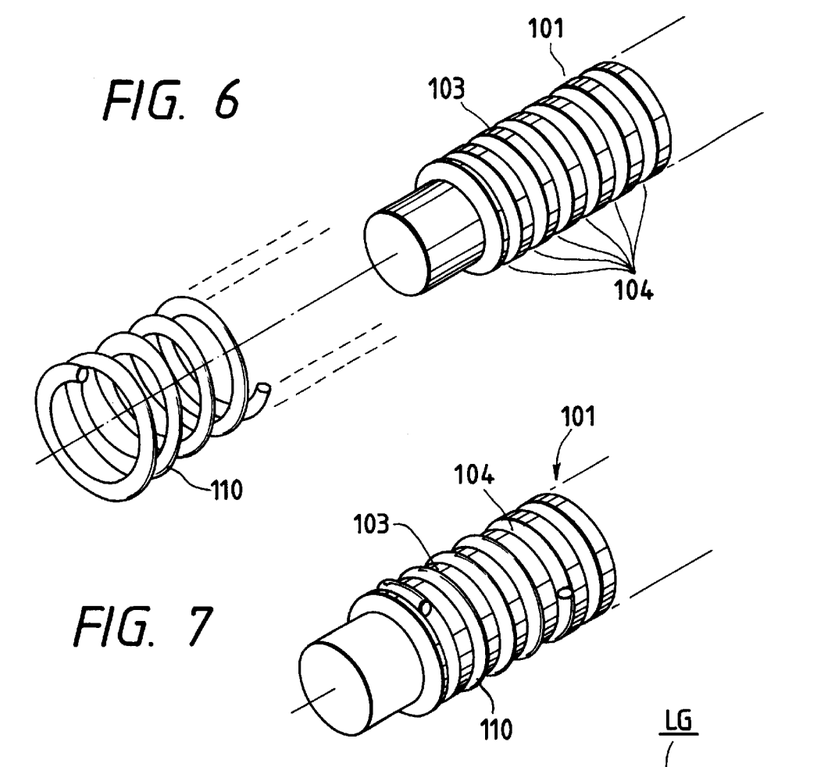
FIGS. 6 and 7 are perspective views for a description of the masking of ball rolling grooves formed in the screw shaft of a ball screw device which is carried out before a surface treating step in a method of manufacturing a ball screw device according to the present invention.

FIGS. 6 and 7 show one example of the aforementioned plastic magnet which masks the ball rolling grooves 104.

After the screw shaft 101 is machined and heat-treated, the ball rolling grooves 104 are finished by grinding.

Thereafter, a spiral protecting member 110 is fitted in the grooves 104 while being wound on the screw shaft 101. In this case, the protecting member provides the spiral protecting member 110 which is made of a rare-earth plastic magnet and deformed spiral in correspondence to the configuration and size of the ball rolling grooves 104 as shown in FIG. 6. Under this condition, after the ball rolling grooves 104 are masked as shown in FIG. 7, the surface of the screw shaft 101 is subjected to rust-proofing surface treatment such as chrome plating and nickel plating.

The spiral protecting member 110, made of a rare-earth plastic magnet, is flexible and elastic; that is, it is freely deformable. Hence, it is magnetically brought into close contact with the ground surfaces of the ball rolling grooves, thus sufficiently mask them.

A protecting member such as the spiral protecting member 110 may be used for masking the ball rolling grooves formed in the ball screw nut 102 as well as the ball rolling grooves 104 of the screw shaft 101. Instead of the plastic magnet, the rubber magnet may be employed to form the spiral protecting member 110.

In the above-described embodiment, the rust-proof surface treatment is achieved by metal plating such as chrome plating and nickel plating; however, the present invention is not limited thereto or thereby. For instance, a film of resin such as fluoro-resin and acrylic resin may be formed on the surfaces.

In the case where a double-layer surface treatment is carried out in which for instance a copper layer is formed, as a base layer, by plating, and then a chromium layer is formed on it by plating, sometimes it is required to form only one of the two layers is formed on a particular surface. This requirement can be satisfied as follows: That is, the protecting member is not used in the surface treating step in which a selected one of the two layers should be formed on all the surfaces, and instead the protecting member is used in the surface treating step in which there is a surface which should not be covered with the selected layer. Thus, only the selected one of the two layers can be formed on the desired surfaces.

The linear guide device to which the manufacturing method of the present invention is applicable is not limited to that which has been described above. That is, in the above-described linear guide device, the slider mounts slidably on the guide rail; however, the technical concept of the present invention is applicable to a linear guide device in which a slider is slidably fitted in a guide rail U-shaped in section. In addition, in the above-described linear guide device, two ball rolling grooves are formed in each of the two side surfaces of the guide rail; however, the present invention may be equally applied to a linear guide device in which one or more than two ball rolling grooves are formed in each of the two side surfaces of the guide rail.

Furthermore, the manufacturing method of the present invention is applicable to all types of ball screw devices such as those of circulating tube type, circulating piece type and end cap type.

In the guide rail manufacturing method, according to one aspect of the present invention, the mounting reference surfaces formed in predetermined outer surfaces of the guide rail and/or the surfaces of the load rolling-element rolling grooves thereof are finished by grinding, and with the protecting members fitted to the surfaces thus finished, the guide rail is subjected to rust-proofing surface treatment. Hence, the guide rail formed according to the method is free from the difficulties accompanying a conventional guide rail that the rust-proofing film layers formed on the guide rail by rust-proof surface treatment are damaged or peeled off when the guide rail is, for instance, ground later. Thus, the guide rail is sufficiently rust-proofed.

Similarly, in the slider body manufacturing method, the mounting reference surfaces formed in predetermined outer surfaces of the slider body and/or the surfaces of the load rolling-element rolling grooves of the same are finished by grinding, and with the protecting members fitted to the surfaces thus finished, the slide body is subjected to rust-proofing surface treatment. Therefore, the slider body manufacturing method has the same effects as the guide rail manufacturing method.

Before the rust-proofing surface treatment is carried out, the mounting reference surfaces finished are masked with the protecting members. Hence, no rust-proofing film layer is formed on the mounting reference surfaces, so that the guide rail and the slider body are high in accuracy.

In the method of manufacturing a ball screw device, according to another aspect of the present invention, the surfaces of the ball rolling grooves of the screw shaft and/or the ball screw nut are finished by grinding, and with the protecting members which are made of the plastic magnet or rubber magnet and fitted to the surfaces thus finished, the rust-proofing surface treatment is carried out to form the rust-proofing film layer thereon. Hence, the rust-proofing film layer thus formed is never be damaged nor peeled off, thus sufficiently contributing to the rust-proofing of the ball screw device.

In the case where the finished surfaces of the ball rolling grooves of the ball screw device are masked with the protecting members made of the plastic magnet or rubber magnet, the protecting members are sufficiently brought in close contact with the surfaces of the spiral ball-rolling grooves because the protecting members are freely deformable. Hence, the entrance of the rust-proofing agent or plating solution into the grooves is positively prevented, whereby the resultant ball screw device is considerably high in accuracy.

While there has been described in connection with the preferred embodiments of the present invention, it will be obvious to those skilled in the art that various changes and modifications may be made therein without departing from the present invention, and it is aimed, therefore, to cover in the appended claims all such changes and modifications as fall within the true spirit and scope of the invention.

CLAIMS

What is claimed is:

1. A method of manufacturing a guide rail of a linear guide device, the linear guide device comprising:

a guide rail including a first load rolling-element rolling groove extended axially in a side surface thereof; and a slider including a second load rolling-element rolling groove so that said second load rolling-element rolling groove is confronted with said first load rolling-element rolling groove of said guide rail, and said slider being moved relative to said guide rail through a plurality of rolling elements which are rolled in a space defined by said first and second load rolling-element rolling grooves, the method comprising the steps of:
  (a) grinding a groove surface of said first load rolling-element rolling groove;
  (b) preparing a protecting member and fitting said protecting member to the surface ground in said step (a), said protecting member being cylindrical and having a round surface facing said first load rolling-element rolling groove, at least a portion of said round surface of said protecting member being brought in close contact with at least a portion of said groove surface of said first load rolling-element rolling groove, while the side surface of the guide rail adjacent said first load rolling-element groove is not protected; and
  (c) subjecting said guide rail to rust-proofing surface treatment after said step (b); wherein said protecting member is made of a material selected from a plastic magnet and a rubber magnet so as to hold the protecting member in place by means of magnetic attraction during said step (c).

2. A method of manufacturing a guide rail of a linear guide device, the linear guide device comprising:

a guide rail including a first load rolling-element rolling groove extended axially in a side surface thereof; and a slider including a second load rolling-element rolling groove so that said second load rolling-element rolling groove is confronted with said first load rolling-element rolling groove of said guide rail, and said slider being moved relative to said guide rail through a plurality of rolling elements which are rolled in a space defined by said first and second load rolling-element rolling grooves, the method comprising the steps of:
  (a) grinding a groove surface of said first load rolling-element rolling groove;
  (b) preparing a protecting member and fitting said protecting member to the surface ground in said step (a), said protecting member being cylindrical and having a round surface facing said first load rolling-element rolling groove, at least a portion of said round surface of said protecting member being brought in close contact with at least a portion of said groove surface of said first load rolling-element rolling groove, while the side surface of the guide rail adjacent said first load rolling-element groove is not protected; and
  (c) subjecting said guide rail to rust-proofing surface treatment after said step (b); wherein said protecting member is made of a metal magnet so as to hold the protecting member in place by means of magnetic attraction during said step (c).

3. A method of manufacturing a slider body of a linear guide device, the linear guide device comprising:

a guide rail including a first load rolling-element rolling groove extended axially in a side surface thereof; and a slider including a slider body and a second load rolling-element rolling groove so that said second load rolling-element rolling groove is confronted with said first load rolling-element rolling groove of said guide rail, and said slider being moved relative to said guide rail through a plurality of rolling elements which are rolled in a space defined by said first and second load rolling-element rolling grooves, the method comprising the steps of:
- (a) grinding a groove surface of said second load rolling-element rolling groove;
- (b) preparing a protecting member and fitting said protecting member to the surface ground in said step (a), said protecting member being cylindrical and having a round surface facing said second load rolling-element rolling groove, at least a portion of said round surface of said protecting member being brought in close contact with at least a portion of said groove surface of said second load rolling-element rolling groove, while surfaces of the slider adjacent said second load rolling-element groove are not protected; and
- (c) subjecting said slider body to rust-proofing surface treatment after said step (b); wherein said protecting member is made of a material selected from a plastic magnet and a rubber magnet so as to hold the protecting member in place by means of magnetic attraction during said step (c).

4. A method of manufacturing a slider body of a linear guide device, the linear guide device comprising:

a guide rail including a first load rolling-element rolling groove extended axially in a side surface thereof; and a slider including a slider body and a second load rolling-element rolling groove so that said second load rolling-element rolling groove is confronted with said first load rolling-element rolling groove of said guide rail, and said slider being moved relative to said guide rail through a plurality of rolling elements which are rolled in a space defined by said first and second load rolling-element rolling grooves, the method comprising the steps of:
- (a) grinding a groove surface of said second load rolling-element rolling groove;
- (b) preparing a protecting member and fitting said protecting member to the surface ground in said step (a), said protecting member being cylindrical and having a round surface facing said second load rolling-element rolling groove, at least a portion of said round surface of said protecting member being brought in close contact with at least a portion of said groove surface of said second load rolling-element rolling groove, while surfaces of the slider adjacent said second load rolling-element groove are not protected; and
- (c) subjecting said slider body to rust-proofing surface treatment after said step (b); wherein said protecting member is made of a metal magnet so as to hold the protecting member in place by means of magnetic attraction during said step (c).

* * * * *